Sept. 11, 1934.  A. F. HANSON  1,973,344

EXTERNAL FLASH REMOVER

Filed May 27, 1932  2 Sheets-Sheet 1

INVENTOR
ARTHUR F. HANSON.
BY John P. Lenbox
ATTORNEY

Sept. 11, 1934.  A. F. HANSON  1,973,344
EXTERNAL FLASH REMOVER
Filed May 27, 1932   2 Sheets-Sheet 2
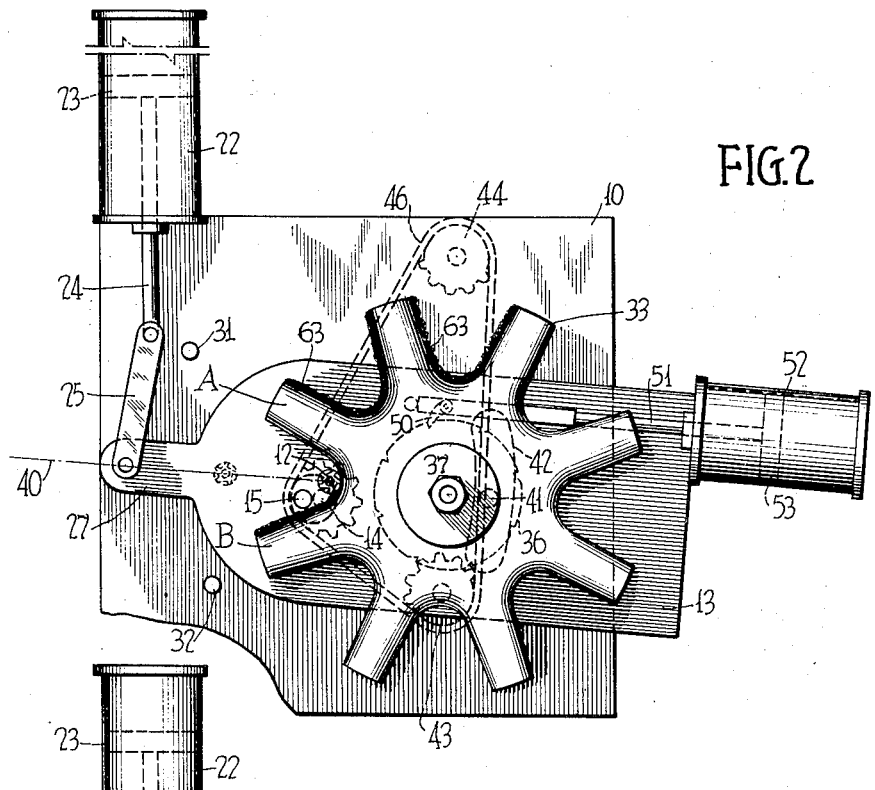
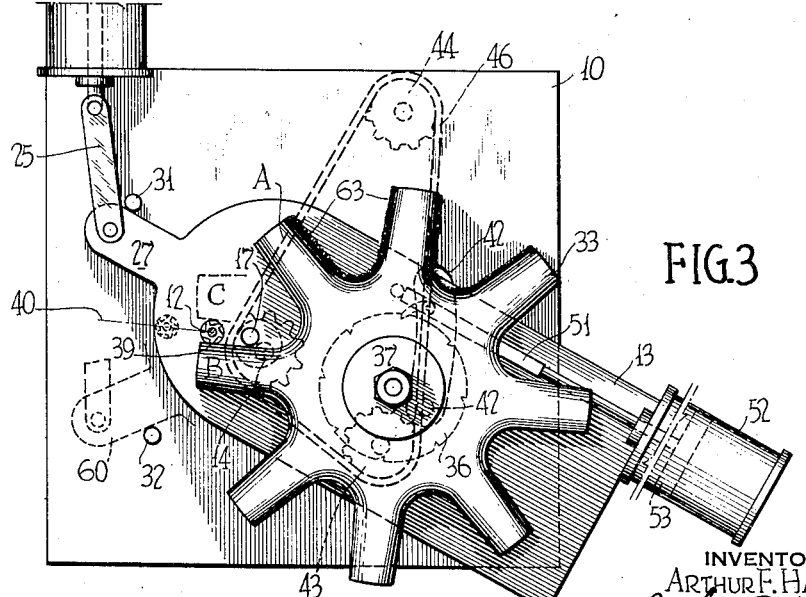
INVENTOR
ARTHUR F. HANSON
BY
ATTORNEY Patented Sept. 11, 1934

1,973,344

UNITED STATES PATENT OFFICE 1,973,344

EXTERNAL FLASH REMOVER

Arthur F. Hanson, Philadelphia, Pa., assignor to Budd Wheel Company, Philadelphia, Pa., a corporation of Pennsylvania Application May 27, 1932, Serial No. 613,852

7 Claims. (Cl. 90—20)

My invention relates to welding and more especially to the removal of what may be called the external flash or fins formed during the welding of complementary type sheet metal members. In the welding of wheels wherein artillery type wheel bodies are made from complementary sheet metal members this situation is quite common. The external flash is unsightly from an artistic standpoint and must be removed prior to finishing the wheel body so that the finished appearance obtained in wood spoke wheels is likewise secured in steel wheel construction.

One object of my invention is the construction of a mechanism capable of removing this external flash from spider type bodies by production methods. Another feature of my invention is the co-ordination of the various co-operating parts of the structure in such a manner that the cutting tool will always be co-operative with the work part without the interposition of variable factors such as the judgment of a workman when aligning these co-operating devices.

I attain the above enumerated desirable objects and others incidental thereto by constructing a device for removing the excess welded material from an artillery type spider substantially along the medial plan thereof, by means of a relatively movable cutting device and work retaining and positioning part.

My invention will be better understood from the following description when considered in connection with the accompanying drawings and its scope will be pointed out in the appended claims.

In the accompanying drawings wherein like ordinals represent corresponding parts in the various figures, Figure 1 is a plan showing the assembled parts and cutting tool in substantially initial position.

Figure 2 is a similar view showing the parts in substantially mid-position as regards the elemental operation.

Figure 3 is a similar view of the co-operating parts substantially at the end of the elemental operation.

Figure 1:
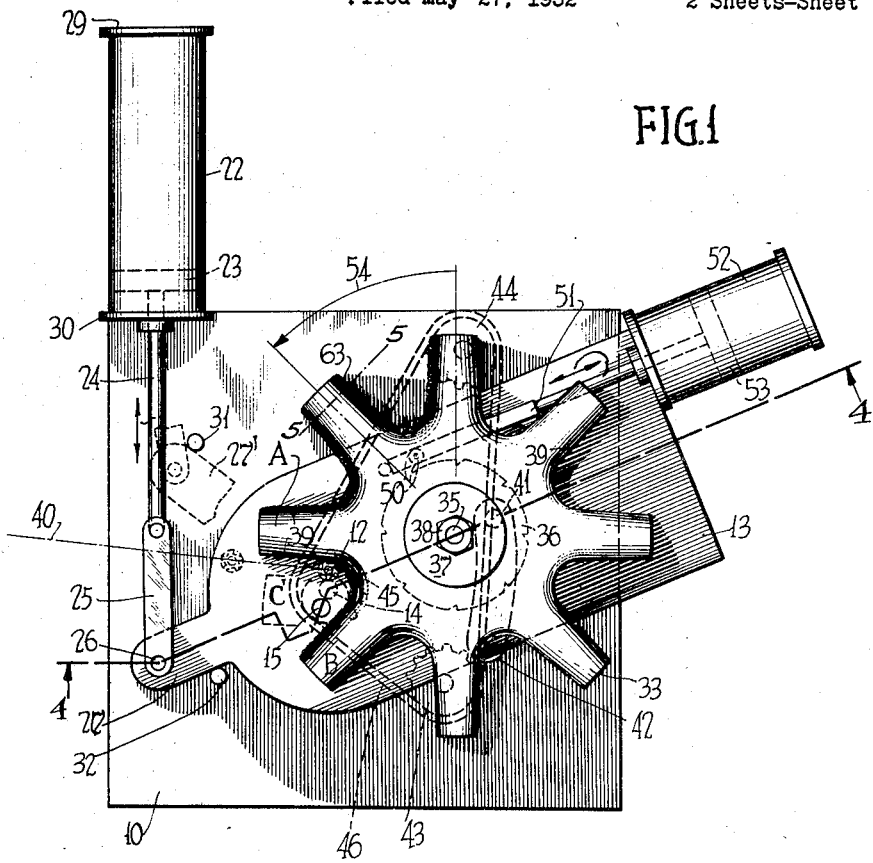
Figure 4:
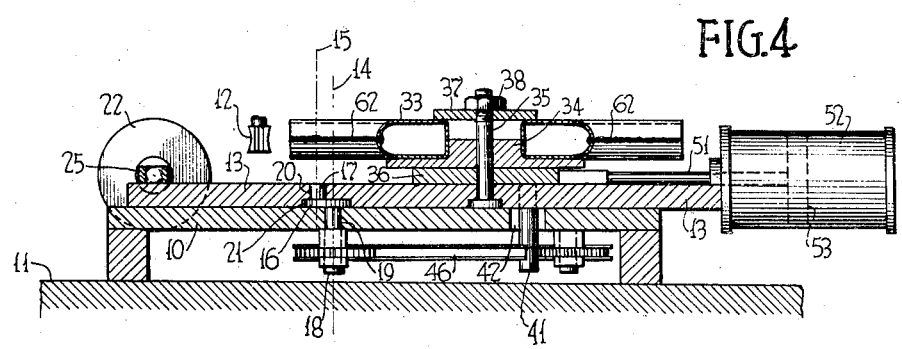
Figure 4 shows a cross section of the apparatus on the line 4—4 of Figure 1.
Figure 5:
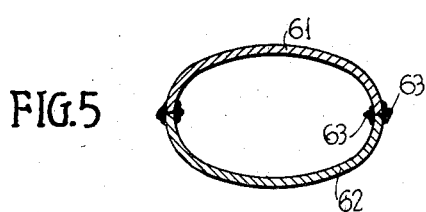
Figure 5 is a spoke cross section on the line 5—5 of Fig. 1 showing the welded joint with the flash remaining thereon after the welding operation.

In accordance with my invention I provide a cutting tool, of suitable form, for example, a milling cutter, and a mechanism adapted to co-operate therewith carrying the work piece to be operated upon, and having suitably co-ordinated actuating devices whereby in effect, a relative motion of the cutter and the work piece is obtained. The cutter follows an elemental working operation corresponding to a radially inward motion substantially along the spoke side, an arcuate motion corresponding to the fillet between adjacent spokes, and motion radially outwardly substantially along the similar portion of the next adjacent spoke.

I have shown a base member 10 constructed as an elemental part of a complete machine adapted to perform the aforementioned desired objects or made as a work holder or jig adapted for co-operation with a previously constructed metal working machine. The base member 10 is mounted upon a work table 11 which may correspond to the work table of an ordinary milling machine or it may be a part of the supporting framework of a machine constructed specifically for this purpose. The member 10 may be rigidly secured to the member 11 and the cutting tool 12 may be adapted for motion with respect thereto, or the cutter 12 may be relatively fixed as regards its position as to the member 11 and the base member 10 may be adapted for relative movement upon the part 11, or any other system of relative motion therebetween may be used. In the various figures I have shown my device schematically for the purpose of simplification and they are not to be construed as showing absolute relative proportions between the parts as obviously for purposes of explanation a machine of this type may be readily simplified. I have likewise for ease of description considered the cutter as movable but it may just as well be fixed and the work piece moved.

Mounted upon the base member 10 is a work carrying member 13 secured thereto by means of a plurality of axes 14 and 15 which in turn are eccentrically connected together. The means shown comprises a substantially circular disc 16 carrying axles 17 and 18 upon opposite sides thereof and in rigid relation thereto. The axle 18 passes through a suitable bearing 19 in the member 10 and the axle 17 passes through a suitable bearing 20 in the member 13. The disc portion 16 likewise is provided in recess 21.

Considering the parts so far discussed it is obvious that the member 13 may be rotated with respect to the primary axis 14 while at the same time receiving an additional motion due to the eccentricity of the axes 14 and 15. To accomplish the rotary motion of member 13, which is restricted, thereby being essentially an oscillating movement about the major axis 14, I have provided a pneumatic motive power device 22 secured upon the member 10 and inter-connected to the member 13 by means of a piston and piston rod 23 and 24 and suitable linkage members 25 pivotally secured of the point 26 to a lever arm type or extension 27 on the member 13. By the mechanism described the piston 23 can be caused to move in a reciprocating manner between the two extremes 29 and 30 of the cylinder 22. This reciprocating motion is transmitted to the member 13 wherein it is transformed into an oscillating motion about the axis 14. This oscillating motion is limited by a plurality of limit stops 31 and 32 which may be adjusted according to the type spider to be joined. In the initial position, the apparatus is as shown in Figure 1 with the arm 27 abutting against the limit stop 32 and the piston 23 substantially at the end 30 of the cylinder. The arm 27 at the other extreme position of motion will correspond to the dotted position 27' against the limit stop 31.

To secure the work piece, which, in this case is illustrated as an eight spoked artillery type wheel body 33, I have shown simply a matrix member 34 with the wheel body positioned thereupon and a bolt or stud 35, which passes through and is secured to the member 13. It likewise passes centrally of the member 36, the matrix member 34 and centrally of the outer retaining clamp 37. The various co-operating parts, hereinbefore enumerated, are fastened together by a nut 38. It is obvious that the type structure herein illustrated and described is fundamentally of the most elemental form possible, however other clamping means of more complex mechanical form may be readily substituted for these parts inasmuch as the purpose to be obtained is rigid securement relatively to the work holder during the cutting procedure.

A cutting tool 12 is adapted for relative motion as respects the substantially radially extending portions 39 of the spokes along an axis 40. This motion is effected either by the movement of the work part or movement of the cutter or comparative movement between the two parts.

In order to accomplish the relative motion between the cutter and the work piece, a simple mechanism is used. This comprises essentially for purposes of simplicity, a pin 41 which is secured to the work carrying member 13 and is adapted to pass through the member 10 by means of an arcuate slot 42. Secured to the base member 10 are a plurality of toothed members 43, 44 and 45. The members 43 and 44 are mounted upon suitable shafts and are freely rotatable with respect thereto, whereas the member 45 is mounted upon the shaft 18 but is keyed thereto and thereby adapted to transmit motion of the member 45 to the eccentric connection of the two axes 14 and 15. The members 43, 44 and 45 although shown as a plurality of toothed members or gear wheels might equally as well be a plurality of pulleys or other members of suitable construction. In the form shown however, by means of a chain drive more positive co-operation of the parts can be obtained. A member in the nature of an inter-connecting belt 46 is secured to the pin 41 by any proper fastening and co-operates with the gear members. If the gear type member is used this would essentially be a chain of proper form.

As to the operation of the mechanism just described, when the piston 23 moves within the cylinder 22 and thereby oscillates member 13 about the axis 14, without any further connections, the only motion would be the motion about the axis 14, whereas by means of the pin and its interconnecting parts when the member 13 moves, the pin likewise moves. The motion of the pin is transmitted by means of the member 46 to the gear 45. Inasmuch as the gear 45 is rigidly secured to the shaft 18 any motion of the gear will cause the eccentric motion to receive a corresponding movement. In this way the member 13 receives a synchronized co-action between its oscillating motion about the axis 14 and its eccentric motion about the same axis. When the cutter is at the position in Figure 1, the hereinbefore described motion will cause a relative co-action between the work piece 33 and the cutter 12 along an arcuate path corresponding to the fillet interconnecting two consecutive spokes.

To jog the work into position with respect to each spoke the member 36 is essentially a ratchet member and has a pawl 50 which is fastened to the connecting rod 51 of the cylinder 52. The motion of the piston 53 gives a step-by-step movement to the work piece and at each operation causes it to take an angular movement substantially equivalent to the number of degrees between two adjacent spokes. In this example an arc 54 is shown. The cylinder 52 is secured to the member 13 and thereby a motion of the cylinder and its co-operating parts, impertinent to the desired operation of the machine is avoided.

The operation of my invention is as follows: the mechanism is in the position shown in Figure 1 and the work piece or spider member is secured thereupon in initial position so that the path 40 of the cutting tool is parallel to the substantially radially extending spoke portion 39. The rotary cutter is started in operation and by relative movement of the parts in effect along the portion 39 of the spoke A which is in position to be worked upon. The cutter continues relatively inwardly to the position of Figure 1 shown in full. After reaching this point the cylinder 22 is started in operation so that relatively the cutter takes an arcuate path corresponding to the fillet between the two spokes A & B. The member 13 continues to move to the relative position of the parts as shown in Figure 2 with the cutter having traversed substantially half of the cutting operation along the fillet. The piston 23 continues in its stroke until limit stop 31 is abutted against by the arm 27 at this time as shown in Figure 3, the substantially radially extending portion of the spoke B, next adjacent the spoke A, is now aligned parallel to the cutter path along the axis 40. The cutter moves outwardly to the position shown in full at which time the elemental working operation is completed. At this time the cutter continues outwardly in its relative motion on the axis 40 and the piston 23 returns the member 13 to its initial position with the arm abutting the stop 32 as shown dotted at 60. The corresponding position of the spoke A would be dotted position C. After the parts are returned to the relatively initial position, corresponding to Figure 1, the piston 53 operates, indexing the work ahead to the next adjacent spoke and the device is now ready to resume another elemental operation.

In Figure 1 the dotted spoke position C corresponds to the position that the spoke B will take in Figure 3 and vice versa, in Figure 3 the dotted spoke C corresponds to the position occupied by the spoke A when in the initial position as in Figure 1.

A cross section on the line 5—5 of Figure 1 shows the fin like formation 63 of the excess welded material after the parts have been butted together. The semi-elliptical cross-sections 61 and 62 correspond to the complementary spoke portions of two artillery type sheet metal members which go to form the completed wheel body 33. It is readily apparent that a completed wheel structure cannot be used as an article of commerce with this unsightly and roughened edge visible.

In Figure 1 a portion of the material has been removed, in Figure 2 a still greater portion and in Figure 3 the entire elemental operation has been completed.

Most of the spokes in the various figures have had the flesh removed but some of them have not been worked upon, necessarily the co-ordination between the cutting operations and the valve control of the various pistons can be accurately timed although I have not shown these particular parts of the mechanism.

The embodiment of the invention illustrated and described herein has been selected for the purpose of clearly setting forth the principles involved. It will be readily apparent, however, that the invention is susceptible of being modified to meet the different conditions encountered in its use. I, therefore, aim to cover in the appended claims all modifications within the true spirit and scope of the invention.

What I claim is:

1. In a machine for removing the external flash from welded artillery type wheel spiders which comprises the combination of a milling machine having a rotary cutter and a work holding jig mounted thereupon and said jig being arranged for relative approach and retrograde movement with respect to said cutter, and means upon said jig including an eccentric mechanism arranged to move the spider against said cutter between consecutive spokes upon an arcuate path of predeterminate work contour, said means including a base and movable support, eccentric interconnected pivots interconnecting said base and movable support, fixed shafts upon said base and support and means interconnecting said shafts and said interconnected pivots.

2. A work holding jig for use in removing external flash from wheel spiders which comprises a relatively stationary base member, a work carrying member mounted upon said base member and arranged for simultaneously oscillating and relatively reciprocating movement about said base and means including plural axes interconnecting said members interposed therebetween, said axes arranged for eccentric motion, means arranged to oscillate said work carrying member about one of said axes, and fixed and movable pivotally mounted gears and belts interconnecting said axes and gears to synchronously co-ordinate said eccentric action with said oscillating motion.

3. A work holding jig for use in removing external flash from wheel spiders formed of complementary artillery type members which comprises a base member, a work piece carrying member mounted upon said base member and arranged for oscillating movement about eccentric plural axes interposed therebetween and interconnecting said members, mans arranged to oscillate said work carrying member about one of said axes, and means interconnecting said members and arranged to synchronize said eccentric motion and said oscillating motion.

4. A work holding jig for use in removing the external flash from wheel spiders comprising a relatively stationary base member, a movable work carrying member, eccentrically connected spindles pivotally mounted in and connecting said base and supporting members, a gear mounted upon the axis of said eccentric pivot mounted in said base member, a plurality of pivotally mounted gears upon said base member, a slot in said base member, a shaft secured to said support and passing through the slot of said base member and means interconnecting said gears and said shaft, whereby to provide simultaneous coordinate oscillatory and reciprocatory motion of said support with respect to a cutter tool.

5. In combination, a base, a wheel spider holder pivoted on the base, a tool for operation on the spider, means for reciprocably pivotally moving the holder, means cooperating between the base and the holder responsive to said pivotal movement for moving the spider to produce, in effect, a movement of the tool radially inwardly along one spoke, about a portion between said spoke and a next adjacent spoke and radially outwardly along the adjacent spoke, and means for stepping the holder about its pivot to position the spider for like movement of the tool relative to the spokes of other adjacent pairs.

6. In combination, a base, a work-holder support, means including eccentric relatively fixed pintles journalled in the base and the support, respectively, means for moving the support on the base, and means cooperating between the base and said pintles and responsive to said movement rendering the pintles effective to cause eccentric movement of the support on the base.

7. In combination, a base, a support, a crank shaft device including eccentric shaft portions journalled in the base and the support, respectively, pulley or sprocket elements fixed to the base and to the base-journalled shaft, respectively, a flexible belt or chain for said pulleys, means for reciprocably moving the support about said device generally as a pivot, a work holder pivotally mounted on the support, means for notching the holder about its pivot, and a tool in fixed relation to the base.

ARTHUR F. HANSON.